(12) United States Patent
de la Torre et al.

(10) Patent No.: US 7,417,331 B2
(45) Date of Patent: Aug. 26, 2008

(54) COMBUSTION ENGINE DRIVEN ELECTRIC GENERATOR APPARATUS

(75) Inventors: Roger A. de la Torre, Wentzville, MO (US); Matthew P. LaConte, Maryland Heights, MO (US); Matthew Allen Adam, Bowling Green, MO (US)

(73) Assignee: Towertech Research Group, Inc., Wentzville, MO (US)

( * ) Notice: Subject to any disclaimer, the term of this patent is extended or adjusted under 35 U.S.C. 154(b) by 155 days.

(21) Appl. No.: 11/429,712

(22) Filed: May 8, 2006

(65) Prior Publication Data

US 2007/0273153 A1 Nov. 29, 2007

(51) Int. Cl.
- *F02B 63/04* (2006.01)
- *F03G 7/08* (2006.01)
- *H02K 7/18* (2006.01)
- *F01C 13/00* (2006.01)
- *F01D 15/10* (2006.01)
- *F02C 6/00* (2006.01)

(52) U.S. Cl. .................. 290/1 R; 290/1 A; 290/4 R; 290/40 R

(58) Field of Classification Search ............ 290/1 A, 290/1 R, 4 R, 40 R
See application file for complete search history.

(56) References Cited

U.S. PATENT DOCUMENTS

| | | | | |
|---|---|---|---|---|
| 2,362,151 A * | 11/1944 | Ostenberg | ............ | 290/1 R |
| 3,135,880 A * | 6/1964 | Olson et al. | ............ | 310/14 |
| 3,247,406 A * | 4/1966 | Toesca | ............ | 310/15 |
| 3,454,779 A * | 7/1969 | Meijer | ............ | 290/1 R |
| 3,465,161 A * | 9/1969 | Cutkosky | ............ | 290/1 R |
| 3,510,703 A * | 5/1970 | Klaue | ............ | 310/70 R |
| 3,559,027 A * | 1/1971 | Arsem | ............ | 322/3 |
| 3,746,937 A * | 7/1973 | Koike | ............ | 318/122 |
| 3,766,399 A * | 10/1973 | Demetrescu | ............ | 290/40 R |
| 4,342,920 A * | 8/1982 | Bucknam | ............ | 290/1 R |
| 4,399,368 A * | 8/1983 | Bucknam | ............ | 290/1 R |
| 4,458,489 A * | 7/1984 | Walsh | ............ | 60/520 |
| 4,480,599 A * | 11/1984 | Allais | ............ | 123/46 R |
| 4,484,082 A * | 11/1984 | Bucknam | ............ | 290/1 R |
| 4,511,805 A * | 4/1985 | Boy-Marcotte et al. | ............ | 290/2 |
| 4,532,431 A * | 7/1985 | Iliev et al. | ............ | 290/4 R |
| 4,631,455 A * | 12/1986 | Taishoff | ............ | 318/37 |
| 4,642,988 A * | 2/1987 | Benson | ............ | 60/641.14 |
| 4,924,123 A * | 5/1990 | Hamajima et al. | ............ | 310/15 |
| 5,002,020 A * | 3/1991 | Kos | ............ | 123/46 E |
| 5,146,750 A * | 9/1992 | Moscrip | ............ | 60/517 |
| 5,391,953 A | 2/1995 | van de Veen | ............ | 310/80 |

(Continued)

FOREIGN PATENT DOCUMENTS

JP 55032484 A * 3/1980

(Continued)

*Primary Examiner*—Darren Schuberg
*Assistant Examiner*—Pedro J Cuevas
(74) *Attorney, Agent, or Firm*—Thompson Coburn LLP

(57) ABSTRACT

An engine drive electric generator apparatus converts the reciprocating movements of a pushrod of an internal combustion engine to electricity. Each generator apparatus has an electric coil surrounding a combustion engine pushrod, and a magnet on the pushrod that reciprocates with the pushrod through the coil. The relative reciprocating movement between the magnet and coil generates an electric current in the coil that is communicated with a battery of the vehicle to charge the battery.

16 Claims, 4 Drawing Sheets

U.S. PATENT DOCUMENTS

| | | | |
|---|---|---|---|
| 5,397,922 A * | 3/1995 | Paul et al. | 290/1 A |
| 5,696,413 A * | 12/1997 | Woodbridge et al. | 310/15 |
| 5,850,111 A * | 12/1998 | Haaland | 310/15 |
| 5,893,343 A * | 4/1999 | Rigazzi | 123/46 E |
| 6,111,375 A | 8/2000 | Zenobi | 318/376 |
| 6,199,519 B1 * | 3/2001 | Van Blarigan | 123/46 R |
| 6,226,990 B1 * | 5/2001 | Conrad | 60/520 |
| 6,237,546 B1 * | 5/2001 | Gander | 123/41 E |
| 6,269,639 B1 * | 8/2001 | Conrad | 60/520 |
| 6,269,640 B1 * | 8/2001 | Conrad | 60/520 |
| 6,279,318 B1 * | 8/2001 | Conrad | 60/520 |
| 6,279,319 B1 * | 8/2001 | Conrad | 60/520 |
| 6,286,310 B1 * | 9/2001 | Conrad | 60/520 |
| 6,293,101 B1 * | 9/2001 | Conrad | 60/520 |
| 6,311,491 B1 * | 11/2001 | Conrad | 60/520 |
| 6,332,319 B1 * | 12/2001 | Conrad | 60/520 |
| 6,345,666 B1 * | 2/2002 | Conrad | 165/154 |
| 6,349,683 B1 * | 2/2002 | Annen et al. | 123/46 E |
| 6,510,689 B2 * | 1/2003 | Budliger | 60/517 |
| 6,532,916 B2 * | 3/2003 | Kerrebrock | 123/46 E |
| 6,541,875 B1 * | 4/2003 | Berlinger et al. | 290/1 R |
| 6,626,138 B2 * | 9/2003 | Sayama et al. | 123/149 R |
| 6,748,907 B2 * | 6/2004 | Malmquist et al. | 123/46 E |
| 6,865,887 B2 * | 3/2005 | Yamamoto | 60/520 |
| 7,032,878 B2 * | 4/2006 | Coura et al. | 251/129.04 |
| 7,194,989 B2 * | 3/2007 | Hallenbeck | 123/56.1 |
| 7,200,994 B2 * | 4/2007 | Chertok | 60/518 |
| 7,207,299 B2 * | 4/2007 | Hofbauer | 123/46 E |
| 7,213,587 B2 * | 5/2007 | Rutten | 123/568.24 |
| 7,255,070 B2 * | 8/2007 | Hofbauer | 123/46 R |
| 7,317,984 B2 * | 1/2008 | Lewis | 701/112 |
| 7,353,106 B2 * | 4/2008 | Kolmanovsky et al. | 701/112 |
| 2001/0001387 A1 * | 5/2001 | Gander | 123/41 E |
| 2002/0083917 A1 * | 7/2002 | Schiefele | 123/250 |
| 2002/0088424 A1 * | 7/2002 | Sayama et al. | 123/192.2 |
| 2003/0024492 A1 * | 2/2003 | Malmquist et al. | 123/46 E |
| 2003/0121259 A1 * | 7/2003 | Conrad | 60/508 |
| 2005/0103287 A1 * | 5/2005 | Hofbauer | 123/46 E |
| 2006/0037594 A1 * | 2/2006 | Rutten | 123/568.18 |
| 2006/0185643 A1 * | 8/2006 | Lee et al. | 123/295 |
| 2006/0196456 A1 * | 9/2006 | Hallenbeck | 123/47 A |
| 2006/0201456 A1 * | 9/2006 | Hofbauer | 123/46 R |
| 2006/0208839 A1 * | 9/2006 | Taylor et al. | 335/205 |
| 2006/0213466 A1 * | 9/2006 | Hofbauer | 123/46 R |
| 2007/0075545 A1 * | 4/2007 | Wilson et al. | 290/1 R |
| 2007/0158945 A1 * | 7/2007 | Annen et al. | 290/1 A |
| 2007/0158946 A1 * | 7/2007 | Annen et al. | 290/1 R |
| 2007/0158947 A1 * | 7/2007 | Annen et al. | 290/1 R |
| 2007/0215093 A1 * | 9/2007 | Lemke et al. | 123/197.4 |
| 2008/0042496 A1 * | 2/2008 | Chiou | 310/15 |
| 2008/0047517 A1 * | 2/2008 | Lewis et al. | 123/179.5 |

FOREIGN PATENT DOCUMENTS

JP     57044732 A * 3/1982

* cited by examiner

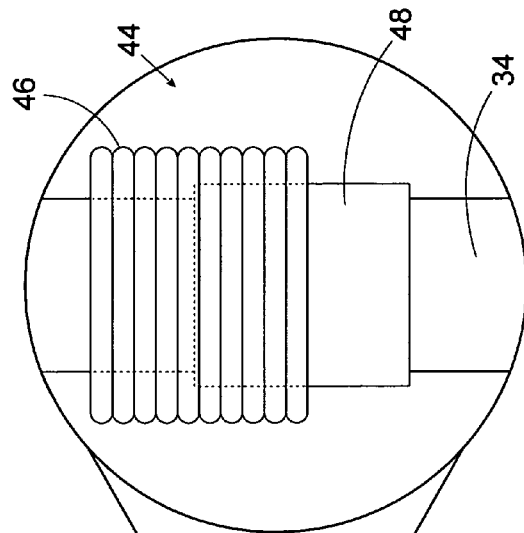
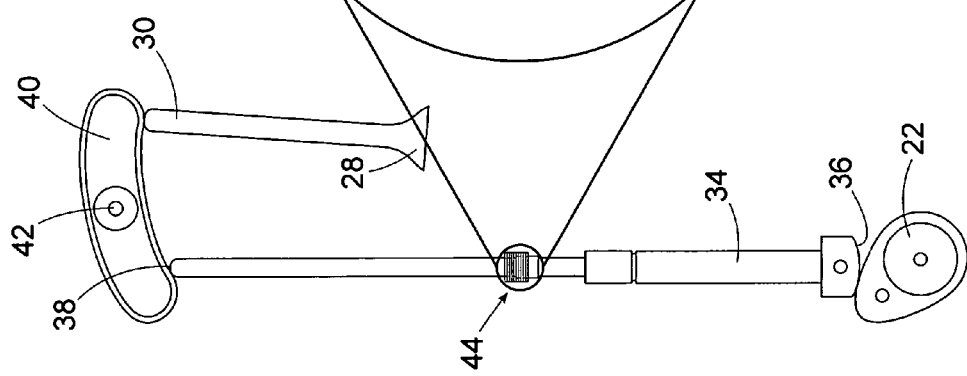
Figure 4
Figure 3
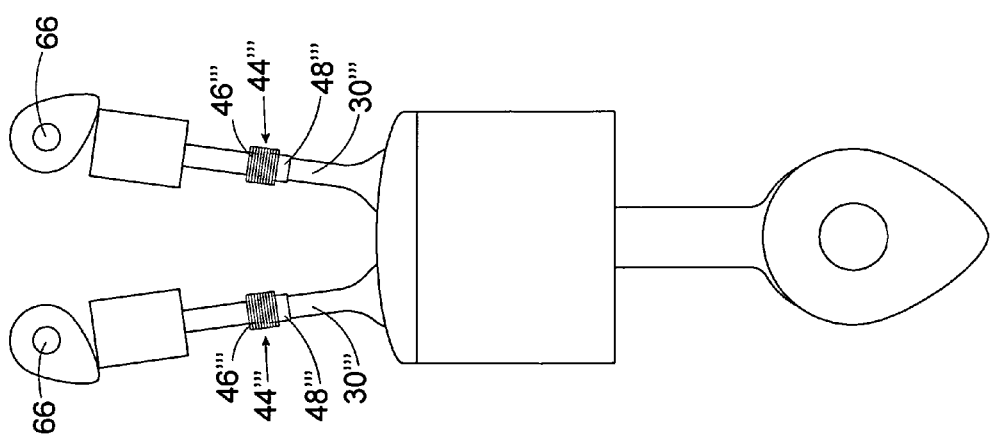
Figure 7

US 7,417,331 B2

COMBUSTION ENGINE DRIVEN ELECTRIC GENERATOR APPARATUS

BACKGROUND OF THE INVENTION (1) Field of the Invention

The present invention pertains to an apparatus that converts the reciprocating movements of a pushrod or another similar rod of an internal combustion engine into electricity. In particular, the present invention pertains to a generator comprised of an electric coil surrounding a combustion engine pushrod, and a magnet on the pushrod that reciprocates with the pushrod through the coil. The relative reciprocating movement between the magnet and coil induces an electric current in the coil that is communicated with a battery of the vehicle to charge the battery.

(2) Description of the Related Art

The increasing cost of fuels used to power internal combustion engine vehicles has lead to the development of hybrid vehicles. Hybrid vehicles are powered by both an internal combustion engine and an electric motor. The electric motor is powered by a battery provided on the vehicle.

The internal combustion engine typically provides power to the battery through an electric generator. The generator is mechanically connected to the output shaft of the internal combustion engine and is electrically connected to the battery. Operation of the internal combustion engine rotates an armature of the generator relative to the stator of the generator, which produces electricity that charges the battery.

In the operation of a conventional hybrid vehicle, the output shaft of the internal combustion engine is the only component of the engine that rotates the armature of the generator to produce the electricity that recharges the vehicle battery. In order to increase the efficiency of a hybrid vehicle, it would be beneficial to convert other mechanical movements of the vehicle internal combustion engine into electricity to assist in recharging the vehicle battery.

SUMMARY OF THE INVENTION

The present invention provides an apparatus that converts the reciprocating movements of one or more rods associated with the operation of a vehicle internal combustion engine into electricity. The apparatus converts the reciprocating movements of each rod, for example a pushrod or a valve stem of the vehicle engine, into electricity that is communicated to a battery of the vehicle to recharge the battery. The battery provides power to an electric motor of the vehicle.

The apparatus of the invention employs one or more electric generators that are comprised of an electrically conducting coil paired with a permanent magnet. In the preferred embodiment of the apparatus of the invention, an electrically conducting coil is positioned around each pushrod and/or valve stem of the vehicle internal combustion engine. Each coil is electrically communicated with a battery associated with the vehicle. A permanent magnet is positioned on the pushrod and/or valve stem at a position where the coil of the pushrod and/or valve stem extends around the magnet. The operation of the vehicle engine produces reciprocating movement of the pushrod and/or valve stem that in turn reciprocates the magnet through the center of the electrically conducting coil paired with the magnet. The relative reciprocating movement of the magnet and coil induces an electric current in the coil. The electric current is communicated with the vehicle battery and recharges the battery.

In the preferred embodiment of the invention, the electric coil is held stationary relative to the vehicle engine, and the magnet is mounted on a reciprocating component part of the engine. In an alternate embodiment of the invention, the magnet of each generator is mounted stationary to the vehicle engine and the coil of each generator that is paired with the magnet is mounted to an engine component part, i.e., a pushrod or a valve stem, that reciprocates relative to the engine. In the same manner as the first embodiment, the relative reciprocating movement between the magnet and coil induces an electric current in the coil that is communicated with the vehicle battery to recharge the battery.

In an internal combustion engine having one or more valves associated with each combustion chamber of the engine, each valve stem can be provided with a coil and magnet generator. In internal combustion engines having rocker arms and pushrods, with the pushrods operatively connected through the rocker arms to the valves of the combustion chambers of the engine, each pushrod can be provided with a coil and magnet generator. With single overhead cam and double overhead cam engines, the coil and magnet generator of the invention can be provided on each pushrod of the engine and/or on each valve stem of the engine. In each embodiment, the plurality of electric generators would all be communicated with the vehicle battery, and the currents induced in each of the generator's coils would recharge the battery on operation of the engine.

DESCRIPTION OF THE DRAWING FIGURES

Further features of the present invention are set forth in the following detailed description of the preferred embodiment of the invention and in the following drawing figures.

FIG. 3 is an enlarged view showing a generator of the invention positioned on the pushrod of the engine shown in FIG. 1.

FIG. 4 is an enlarged view of the generator of FIG. 3.

FIG. 7 is a schematic representation of generators of the invention mounted on valve stems of an internal combustion engine having double overhead cams.

DETAILED DESCRIPTION OF THE PREFERRED EMBODIMENT

Figure 1:
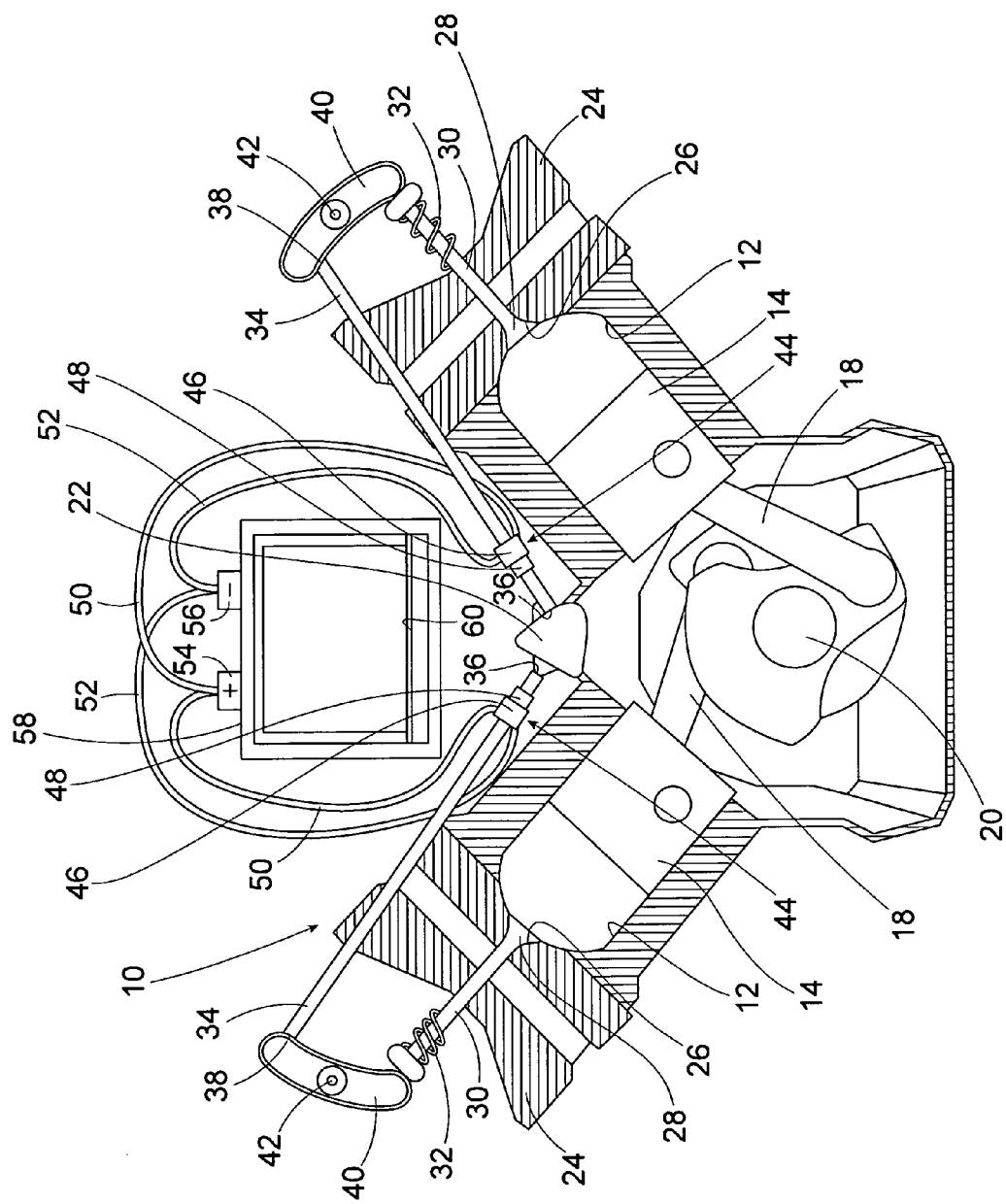
FIG. 1 shows a schematic cross-section view representing a first embodiment of the invention mounted on an internal combustion engine of a vehicle having a battery.

The apparatus of the invention has been designed for use with an internal combustion engine of a vehicle that also has a battery associated with the engine. In the preferred embodiment, the vehicle is a hybrid automobile where the battery provides power to an electric motor. However, the general concept of the invention can be employed in almost any type of situation where there is a battery associated with an internal combustion engine. Because the concept of the invention may be employed in most any situation involving a battery associated with an internal combustion engine, the internal combustion engines with which the invention is described herein will not be described in detail, or shown in detail in the drawing figures.

FIG. 1 shows a cross-section schematic representation of a first embodiment of the apparatus of the invention employed with a V-engine and a battery associated with the engine. It should be understood that it is not necessary that the apparatus of the invention be employed with a V internal combustion engine. The apparatus of the invention, as will be explained, can be employed with internal combustion engines having in-line configurations and flat configurations of their internal combustion chambers. Because the type of engine with which the apparatus of the invention is employed is not important for the operation of the apparatus, the V internal combustion engine is shown only schematically in FIGS. 1 and 2, and is described only generally herein.

Figure 2:
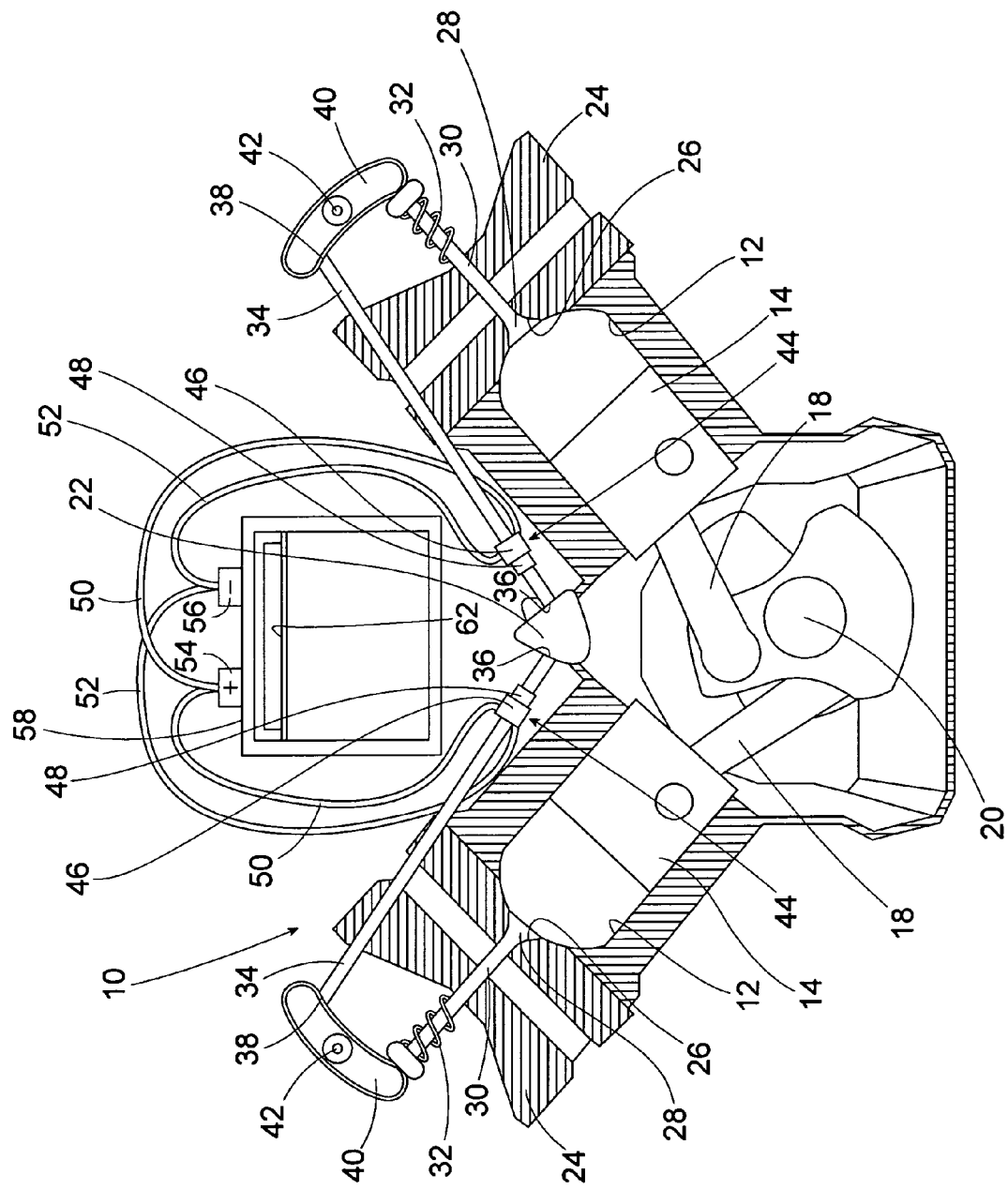
FIG. 2 is a view similar to that of FIG. 1, but showing the vehicle battery having a charged state.

The internal combustion engine 10 shown in FIGS. 1 and 2 has a plurality of internal combustion chambers 12. Pistons 14 are mounted in each internal combustion chamber 12 for reciprocating movement of the pistons in the chambers, as is conventional. The pistons 14 are connected by piston rods 18 to a crankshaft 20 of the engine. The crankshaft 20 also functions as the output shaft of the engine and is rotated on operation of the engine.

A camshaft 22 is also mounted in the engine for rotation. The camshaft 22 is operatively connected with the crankshaft 20 for rotation of the camshaft 22 by rotation of the crankshaft 20. The operative connection between the camshaft 22 and crankshaft 20 is provided by gearing or a belt connection (not shown) or any other conventional operative connection.

Heads 24 are mounted on the engine 10 over the combustion chambers 12. The heads 24 have valve openings 26. The valve openings 26 communicate the combustion chambers 12 with a source of air and fuel that is combusted in the chambers, and also communicate the chambers 12 with an exhaust out of the chambers. Valves 28 are mounted in the heads 24 with stems or rods 30 of the valves extending through the heads. The valves 28 and their stems 30 are reciprocated in the heads 24 during operation of the engine to open and close the valve openings 26 of the combustion chambers 12. The valves 28 shown in FIGS. 1 and 2 have springs 32 that bias the valves to their closed positions relative to the valve openings 26.

A plurality of additional rods 34, or pushrods, are also mounted in the heads 24 for reciprocating movements of the pushrods in the heads. As seen in FIGS. 1 and 2, each of the pushrods 34 has a straight length that extends between first 36 and second 38 ends of the pushrod. The first ends 36 of the pushrods 34 engage in sliding engagement with the cam surfaces of the camshaft 22. This sliding engagement of the pushrod first ends 36 with the cam surfaces of the camshaft 22 cause the pushrods 34 to reciprocate in the heads 24 in response to the rotation of the camshaft 22 on operation of the engine 10. The opposite, second ends 38 of the pushrods 34 project outwardly from the heads 24.

Rocker arms 40 are mounted on the engine heads 24 in the conventional manner. The rocker arms 40 pivot about pivot shafts 42 extending through the rocker arms. The valve stems or valve rods 30 engage with the rocker arms 40 at one side of the rocker arm shafts 42, and the pushrod second ends 38 engage with the rocker arms 40 on the opposite side of the rocker arm shafts 42. Thus, the rocker arms 40 provide an operative connection between the pushrods 34 and the valves 28 that causes both the pushrods 34 and the valve stems 30 to reciprocate relative to the engine 10 on operation of the engine.

In the embodiment of the invention shown in FIGS. 1 and 2, a generator 44 of the invention is shown operatively connected to each pushrod 34 of the internal combustion engine 10. It should be understood that in other embodiments of the invention to be explained, a generator 44 of the invention could be operatively connected to both the pushrods 34 and valve stems 30 of the engine, or only to the valve stems 30 of the engine. Still further, it should be appreciated that the generators 44 of the invention may be operatively connected to any structural rod component of the engine 10 that reciprocates relative to the engine on operation of the engine.

Each generator 44 of the invention is basically comprised of a coil conductor 46 and a permanent magnet 48. FIG. 3 shows an enlarged view of the generator 44 mounted on the pushrod 34 as shown on FIGS. 1 and 2, and FIG. 4 shows an enlarged view of the construction of the generator 44. The magnet 48 is preferably fixed stationary on the pushrod 34 for reciprocating movement with the pushrod. The magnet 48 could be a solid, cylindrical magnet that is mounted between two portions of the pushrod 34. The magnet 48 could also be a hollow cylindrical magnet that is mounted on the exterior surface of the pushrod 34. Other equivalent arrangements could be employed, with the magnet 48 having any equivalent configuration and mounting relative to the pushrod 34 to cause the magnet 48 to reciprocate with the reciprocating movements of the pushrod 34.

The coil conductor 46 is preferably a length of electrical conductor, for example a length of copper wire, that is formed in a coil around the pushrod 34 and around the magnet 48. The coil conductors 46 are mounted stationary relative to the engine 10. As shown in FIGS. 1 and 2, additional electrical conductors 50, 52 communicate each of the coil conductors 46 with the opposite positive and negative terminals 54, 56 of a battery 58 associated with the internal combustion engine 10. The battery 58 is shown schematically in FIG. 1 to have a low level of charge 60.

On operation of the combustion engine 10, the rotation of the camshaft 22 caused by engine operation causes the plurality of pushrods 34 to reciprocate relative to the engine 10. This in turn causes the magnets 48 of the generators 44 to reciprocate toward and away from the coil conductors 46 paired with each magnet 48. This in turn induces an electric current in the coil conductors 46 that is communicated by the additional conductors 50, 52 with the terminals 54, 56 of the battery 58, charging the battery. In FIG. 2, the battery 58 is shown schematically as having a high level of charge 62 as a result of the induced currents in the generators 44.

Although in the embodiment of the invention shown in FIGS. 1-4, the magnets 48 are mounted on the pushrods 34 for reciprocating movements and the coil conductors 46 are mounted stationary relative to the engine 10, the component parts of the generators could be reversed. The coil conductors 46 could be mounted in the positions of the magnets on the pushrods 34 for reciprocating movements with the pushrods, and the magnets 48 could be mounted in the positions of the coil conductors stationary relative to the engine 10. In either embodiment, operation of the engine causes relative reciprocating movement between the generator magnets 48 and conductors 46 that induces a current in the conductors 46 that is communicated to the battery 58 to charge the battery.

Figure 5:
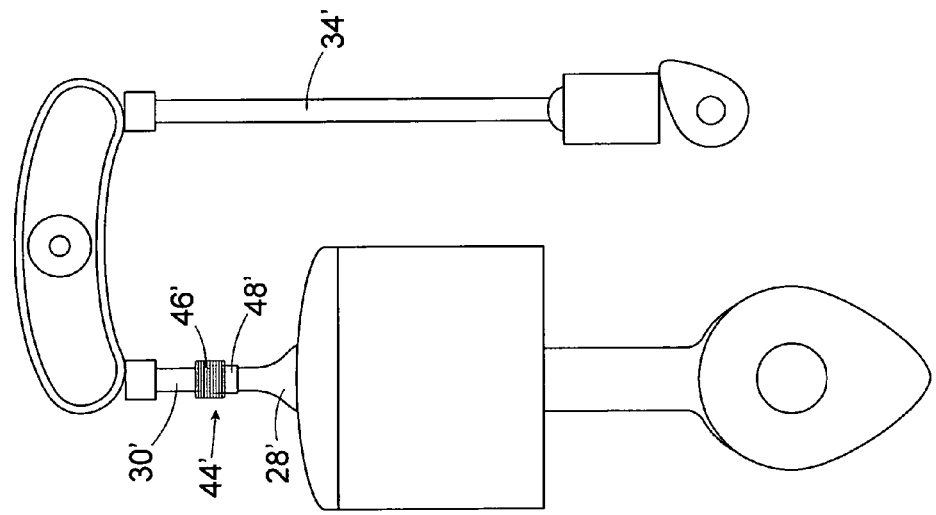
FIG. 5 is a representation of the generator of the invention mounted on a pushrod of an engine having rocker arms operatively connecting the engine with valves of the engine internal combustion chamber.

FIG. 5 is a schematic representation of a variant embodiment of the generator shown in FIGS. 1-4. The component parts of the invention are identified in FIG. 5 using the same numbering of FIGS. 1-4 but followed by a prime ('). In FIG. 5, the generator 44' is not mounted on the pushrod 34' as in the previously described embodiment, but is mounted on the rod 30' provided by the valve stem of the internal combustion engine valve 28'. In the embodiment shown in FIG. 5, the magnet 48' is mounted on the valve stem 30', and the coil conductor 46' is mounted stationary relative to the internal combustion engine. Operation of the engine causes reciprocating movement of the valve stem 30', which in turn causes reciprocating movement of the magnet 48' toward and away from the coil conductor 46'. The relative reciprocating movement between the magnet 48' and the coil conductor 46' induces a current in the conductor 46', and the current is communicated with the battery to charge the battery. As in the previously described embodiments, the coil conductor 46' could be mounted to the valve stem 30' for reciprocating movement with the valve stem, and the magnet 48' could be mounted stationary relative to the engine. This arrangement would also result in relative reciprocating movement between the magnet and the conductor that induces the current in the conductor.

Figure 6:
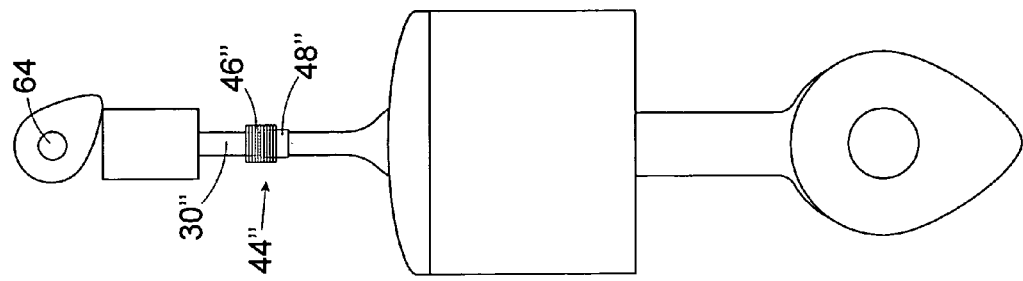
FIG. 6 is a representation of a generator of the invention mounted on a valve stem of an internal combustion engine having a single overhead cam.

FIG. 6 shows a further variant embodiment of the invention shown in FIG. 5. In the FIG. 6 embodiment, the component parts of the invention are identified by the same numbers as in FIGS. 1-4, but the numbers are followed by a double prime ("). The generator 44" is shown mounted on the valve stem 30" as in FIG. 5, but the valve stem 30" is in an overhead cam engine, specifically a single overhead cam engine. Here, a camshaft 64 engages directly with the valve stem 30" for reciprocating movement of the valve stem 30" on operation of the engine. As in the previously described embodiments, in this arrangement, operation of the engine results in relative reciprocating movement between the coil conductor 46" and the magnet 48" of the generator 44", that induces a current in the conductor 46" that is communicated to the battery to charge the battery.

FIG. 7 shows a still further embodiment of the generator employed on a double overhead cam engine. The component parts of the invention are identified by the same numbers used in FIGS. 1-4, but the numbers are followed by a triple prime ('''). The embodiment of FIG. 7 is similar to that of FIG. 6, except for a pair of valves having valve stems 30''' that are reciprocated relative to the engine on operation of the engine. In the FIG. 7 embodiment a pair of overhead camshafts 66 engage with the valve stems 30''' to cause reciprocating movement of the valve stems in response to operation of the engine. The reciprocating movement of the valve stems 30''' causes relative reciprocating movements between the magnets 48''' and the coil conductors 46''' of the generators 44'''. The relative reciprocating movements of the magnets 48''' and conductors 46''' induces a current in each conductor that is communicated to the battery to charge the battery.

Although the apparatus of the invention is described above by reference to several specific embodiments, it should be understood that modifications and variations of the apparatus may be arrived at without departing from the intended scope of the following claims.

The invention claimed is:

1. An engine driven electric generator apparatus comprising:
   an engine having an output shaft that is rotated by operation of the engine;
   a rod operatively connected to the engine for reciprocating movement of the rod relative to the engine in response to operation of the engine;
   a battery;
   an electrical conductor electrically communicating with the battery;
   a magnet adjacent the electrical conductor, where one of the electrical conductor and the magnet is stationary relative to the engine and the other of the electrical conductor and the magnet is operatively connected to the rod for reciprocating movement with the rod that causes relative reciprocating movement between the electrical conductor and the magnet that generates an electric current in the electrical conductor that is communicated to the battery to charge the battery;
   the engine being an internal combustion engine having at least one internal combustion chamber, the internal combustion chamber having a valve opening; and,
   a valve that is movable relative to the valve opening to open and close the valve opening, the valve being operatively connected to the rod whereby the valve moves to open and close the valve opening in response to the reciprocating movement of the rod.

2. The apparatus of claim 1, further comprising:
the rod being a portion of a valve stem that is connected to and extends from the valve.

3. The apparatus of claim 1, further comprising:
the rod being a portion of a pushrod of the engine; and,
the engine having a rocker arm, the rocker arm operatively connecting the pushrod to the valve.

4. The apparatus of claim 1, further comprising:
the engine having a camshaft that is rotated in response to operation of the engine, and the rod engages with the camshaft.

5. The apparatus of claim 1, further comprising:
the valve being one of a plurality of valves; and,
the rod being one of a plurality of rods that are each operatively connected to a valve of the plurality of valves for reciprocating movement of each rod relative to the engine in response to operation of the engine;
the electrical conductor being one of a plurality of electrical conductors that each electrically communicate with the battery;
the magnet being one of a plurality of magnets with each magnet being paired with and positioned adjacent an electrical conductor; and,
where in each paired electrical conductor and magnet, one of the electrical conductor and magnet is stationary relative to the engine and the other of the electrical conductor and magnet is operatively connected to the rod for reciprocating movement between the electrical conductor and the magnet that generates an electrical current in the electrical conductor that is communicated to the battery to charge the battery.

6. An engine driven electrical generator apparatus comprising:
   an engine having an output shaft that is rotated by operation of the engine;
   a plurality of rods that are operatively connected to the engine for reciprocating movement of the plurality of rods in response to operation of the engine;
   a battery associated with the engine;
   a plurality of electrical conductors that electrically communicate with the battery;
   a plurality of magnets, each magnet being paired with and positioned adjacent an electrical conductor of the plurality of electrical conductors;
   in each paired electrical conductor and magnet, one of the electrical conductor and magnet being stationary relative to the engine and the other of the electrical conductor and magnet being operatively connected to a rod of the plurality of rods for reciprocating movement with the rod that causes relative reciprocating movement between the paired electrical conductor and magnet that generates an electric current in the electrical conductor that is communicated to the battery to charge the battery;
   the engine being an internal combustion engine having at least one combustion chamber, the combustion chamber having a plurality of valve openings; and, a plurality of valves that are each movable relative to one of the plurality of valve openings to open and close the valve openings, each valve being operatively connected to one of the plurality of rods whereby the plurality of valves move to open and close the plurality of valve openings in response to the reciprocating movement of the plurality of rods.

7. The apparatus of claim 6, further comprising:
each rod of the plurality of rods being a portion of a valve stem that is connected to a valve of the plurality of valves.

8. The apparatus of claim 6, further comprising:
each rod of the plurality of rods being a portion of a pushrod of the engine; and,
the engine having a plurality of rocker arms operatively connecting the plurality of pushrods with the plurality of valves.

9. The apparatus of claim 6, further comprising:
the engine having a camshaft that is rotated in response to engine operation; and,
the plurality of rods engaging with the camshaft.

10. The apparatus of claim 6, further comprising:
each conductor of the plurality of conductors being a coil.

11. The apparatus of claim 10, further comprising:
each magnet of the plurality of magnets being positioned inside a coil of the plurality of coils.

12. An engine driven electric generator apparatus comprising:
an engine having an output shaft that is rotated by operation of the engine;
a rod mounted on the engine for reciprocating movement of the rod relative to the engine in response to operation of the engine;
a battery;
an electrically conductive coil electrically communicating with the battery, the coil extending around the rod;
a magnet mounted on the rod for reciprocating movement of the magnet with the rod and reciprocating movement of the magnet relative to the coil extending around the rod where the reciprocating movement of the magnet relative to the coil generates an electric current in the coil that is communicated to the battery to charge the battery;
the engine being an internal combustion engine having at least one combustion chamber and at least one valve opening to the combustion chamber; and,
a valve that is mounted on the engine for reciprocating movement of the valve relative to the engine, the valve being positioned on the engine to open and close the valve opening in response to the reciprocating movement of the valve, the valve being operatively connected to the rod whereby the reciprocating movement of the valve is in response to the reciprocating movement of the rod.

13. The apparatus of claim 12, further comprising:
the rod being a portion of a valve stem that extends from the valve.

14. The apparatus of claim 12, further comprising:
the engine having a camshaft that is rotated in response to operation of the engine; and,
the rod being operatively connected to the camshaft whereby the rod reciprocates in response to camshaft rotation.

15. An engine driven electric generator apparatus comprising:
an engine having an output shaft that is rotated by operation of the engine;
a rod mounted on the engine for reciprocating movement of the rod relative to the engine in response to operation of the engine;
a battery;
an electrically conductive coil electrically communicating with the battery, the coil extending around the rod;
a magnet mounted on the rod for reciprocating movement of the magnet with the rod and reciprocating movement of the magnet relative to the coil extending around the rod where the reciprocating movement of the magnet relative to the coil generates an electric current in the coil that is communicated to the battery to charge the battery;
the rod being a portion of a pushrod of the engine; and,
the engine having a rocker arm that operatively connects the pushrod to the valve.

16. An engine driven electric generator apparatus comprising:
an internal combustion engine having an output shaft that is rotated on operation of the engine, and a plurality of combustion chambers having a plurality of valve openings into the combustion chambers;
a plurality of rods mounted on the engine for reciprocating movement of the rods relative to the engine in response to operation of the engine;
a plurality of valves mounted on the engine at the plurality of valve openings for movement of the plurality of valves relative to the plurality of valve openings to open and close the valve openings, the plurality of valves being operatively connected to the plurality of rods whereby the plurality of valves move to open and close the plurality of vent openings in response to reciprocating movement of the plurality of rods;
a battery;
a plurality of electrically conductive coils electrically communicating with the battery, each coil of the plurality of coils extending around a rod of the plurality of rods;
a plurality of magnets positioned inside the plurality of coils and mounted on the plurality of rods for reciprocating movement of the plurality of magnets with the plurality of rods inside the plurality of coils, where the reciprocating movement of the plurality of magnets inside the plurality of coils generates an electric current in the plurality of coils that is communicated to the battery to charge the battery; and,
the plurality of rods are pushrods of the engine that are operatively connected to the plurality of valves.

* * * * *